United States Patent [19]
Ries

[11] Patent Number: 6,005,194
[45] Date of Patent: Dec. 21, 1999

[54] A.C. CABLE WITH TWO CONCENTRIC CONDUCTOR CONFIGURATIONS OF STRANDED SINGLE CONDUCTORS

[75] Inventor: Günter Ries, Erlangen, Germany

[73] Assignee: Siemens Aktiengesellschaft, Munich, Germany

[21] Appl. No.: 08/973,392

[22] PCT Filed: May 22, 1996

[86] PCT No.: PCT/DE96/00898

§ 371 Date: Mar. 5, 1998

§ 102(e) Date: Mar. 5, 1998

[87] PCT Pub. No.: WO96/39706

PCT Pub. Date: Dec. 12, 1996

[30] Foreign Application Priority Data

Jun. 6, 1995 [DE] Germany ............................ 195 20 587

[51] Int. Cl.⁶ .................................................. H01B 12/08
[52] U.S. Cl. ................................. 174/125.1; 174/128.1; 505/231; 505/239; 505/887
[58] Field of Search ............................. 174/125.1, 126.1, 174/126.2, 126.4, 128.1, 128.2, 130, 131 R, 131 A, 131 B; 505/230, 231, 232, 237, 239, 884, 886, 887

[56] References Cited

U.S. PATENT DOCUMENTS

| | | | |
|---|---|---|---|
| 3,730,966 | 5/1973 | Aupoix et al. | 174/125.1 X |
| 4,673,775 | 6/1987 | Nigol et al. | 174/130 |

FOREIGN PATENT DOCUMENTS

| | | | |
|---|---|---|---|
| 1555807 | 1/1969 | France | 505/886 |
| 2309986 | 11/1976 | France | 505/887 |
| 2210173 | 9/1973 | Germany | 505/886 |
| 5-144332 | 6/1993 | Japan | 505/231 |
| 5-334921 | 12/1993 | Japan | 505/232 |
| 6-44832 | 2/1994 | Japan | 505/231 |
| 6-44833 | 2/1994 | Japan | 505/231 |
| 6-44834 | 2/1994 | Japan | 505/231 |
| 6-203655 | 7/1994 | Japan | 505/886 |
| 6-325631 | 11/1994 | Japan | 505/230 |

OTHER PUBLICATIONS

M. Garber, IEEE, 4 pages (from 505/886), 1979 no month.
J. F. Bussiere, "The Development of Low–Loss Nb3Sn for AC Power Transmission", IEEE Transactions on Magnetics, vol. MAG–13, No. 1, pp. 131–137, Jan. 1977.

Primary Examiner—Hyung-Sub Sough
Attorney, Agent, or Firm—Kenyon & Kenyon

[57] ABSTRACT

An a.c. cable has at least one cable core (15) with two concentric conductor arrangements (8, 9) used as forward and return conductors. At least one of the conductor arrangements (8, 9) contains a plurality of conductor layers ($L_j$ and $L_j'$) made of stranded normally conducting or superconducting individual conductors (3). The individual conductors preferably feature high-$T_c$ superconducting materials. The wire angles ($\alpha_j$, $\alpha_j'$) in the individual conductor layers ($L_j$ and $L_j'$) should be selected so as to minimize losses. A calculation formula for the wire angles ($\alpha_j$, $\alpha_j'$) is given for this purpose.

8 Claims, 3 Drawing Sheets

A.C. CABLE WITH TWO CONCENTRIC CONDUCTOR CONFIGURATIONS OF STRANDED SINGLE CONDUCTORS

This application is a continuation of International application No. PCT/DE96/00898, filed May 22, 1996.

FIELD OF THE INVENTION

The present invention relates to an a.c. cable with at least one cable core having two concentric conductor arrangements of stranded single conductors as a.c. forward and return conductors.

BACKGROUND INFORMATION

German Patent No. 38 11 051 C describes an A.C. cable having concentric conductor arrangements, with one of the arrangements being formed of a plurality of conductor layers formed by individual conductors laid helix-like at predefined wire angles around a carrier body.

The development of a.c. cables with electric conductors containing superconducting metal oxide compounds as conducting materials is of particular interest today. Such superconducting metal oxide compounds with high critical temperatures $T_c$ of preferably over 77 K, which can be cooled with liquid nitrogen at normal pressure, are generally known. These compounds are therefore also referred to as high-$T_c$ or high-temperature superconducting materials (abbreviated as HTSC materials). Suitable metal oxide compounds include in particular cuprates, for example, Y—Ba—Cu—O or (Bi,Pb)—Sr—Ca—Cu—O system-based cuprates.

Conductors allowing superconducting cable cores of a.c. cables to be built can be constructed from these HTSC materials for electric power transmission with low losses and small cross sections. Economic advantages are thus achieved in comparison with conventional normally conducting cables, since the a.c. field losses, including the energy consumed in a refrigeration system used to dissipate said losses, are lower than the losses in a comparable normally conducting cable.

Estimates and loss measurements on cable models lead to the expectation that this object cannot be easily achieved if cable cores with a plurality of layers of strip-shaped HTSC elementary conductors, for example, are required for the current-carrying capacity in question. It is considered that this is due to the movement, accompanied by losses, of the magnetic self-field flux into and out of the superconductor and induced eddy currents in metallic conductor components.

According to a known, empirically supported loss theory, the magnetic field on the conductor surface should be selected to be as small as possible. This theory, however, applied to an a.c. cable, means that the diameter of the cable cores should be sufficiently large so that the current can be carried with a single layer of single superconductors. This, however, causes problems regarding

- low flexibility and large allowable radii during manufacturing, transportation, and storage,
- a high volume of electrical insulation, high dielectric losses, and high capacitance,
- large cryogenic shell surface and considerable influx of heat into the coolant.

No measures are currently known to eliminate these problems.

SUMMARY OF THE INVENTION

An object of the present invention is to provide an A.C. cable with at least one cable core having two concentric conductor arrangements of stranded single conductors as A.C. forward and return conductors, with at least one of the conductor arrangements formed as a plurality of conductor layers formed by individual conductors laid helix-like at predefined wire angles around a carrier body with the cable of the present invention, most of the aforementioned problems, in particular when using superconducting materials, do not occur. An a.c. cable according to the present invention should also be applicable to normally conducting cables.

The present invention is based on the fact that, in a cable core, with a single layer of conductors stranded with a wire angle $\alpha$, current I follows spiral paths and has, in addition to an axial component $I_z = I \cos \alpha$ along the cable core axis (z direction), an azimuthal component $I_\phi = I \sin \alpha$ in the peripheral direction. Therefore, a single layer with specific current density J generates two magnetic field components:

in the external space around the conductor layer (with radius r>R), the field is purely azimuthal:

$H_\phi = J_z R/r = J \cos \alpha R/r.$ in the internal space enclosed by the conductor layer (with radius r<R), the field is homogeneous and is directed along the cable axis z:

$H_z = J_\phi = J \sin \alpha,$ where $\alpha$ is the wire angle between the individual superconductors and the cable axis (in the z direction), R is the radius of the single conductor layer, $J = I/(2\pi R \cos \alpha)$ is the specific current density on the conductor surface (=the current in a strip-shaped single conductor per unit of strip width).

In such a single-layer cable core, the alternating field losses are caused by the field component of the outside surface $H_\phi(R) = J_z = I/(2\pi R).$ On the other hand, the overlapping of the absolute field values of the individual conductor layers must be taken into account for multilayer stranded cable cores. The total field here has only one $\phi$ component on the outside and only one z component on the inside. Both field components are present, however, in the space between adjacent conductor layers.

It has now been recognized that at least most of the alternate field losses caused by these two field components in the intermediary space can be prevented with the multilayer cable core stranding design of the a.c. cable according to the present invention, because it prevents the magnetic flux from drifting through the conductors from the outside into the intermediary space between the individual layers. This advantageously eliminates the relatively high losses associated with said phenomenon. These considerations apply both to superconducting conductors, in particular conductors containing HTSC materials, and to normally conducting conductors. As a result, for example, in a cable according to the present invention having at least three conductor layers in each conductor arrangement, the wire angles of the individual conductors either only increase or only decrease (without polarity reversal of the angle change). In the conventional cable designs, on the other hand, changes in the wire angles occur with reversal of polarity (see, e.g., German Published Patent Application No. 1 814 036 or European Patent No. 623 937 A).

DETAILED DESCRIPTION OF THE INVENTION

Figure 1:
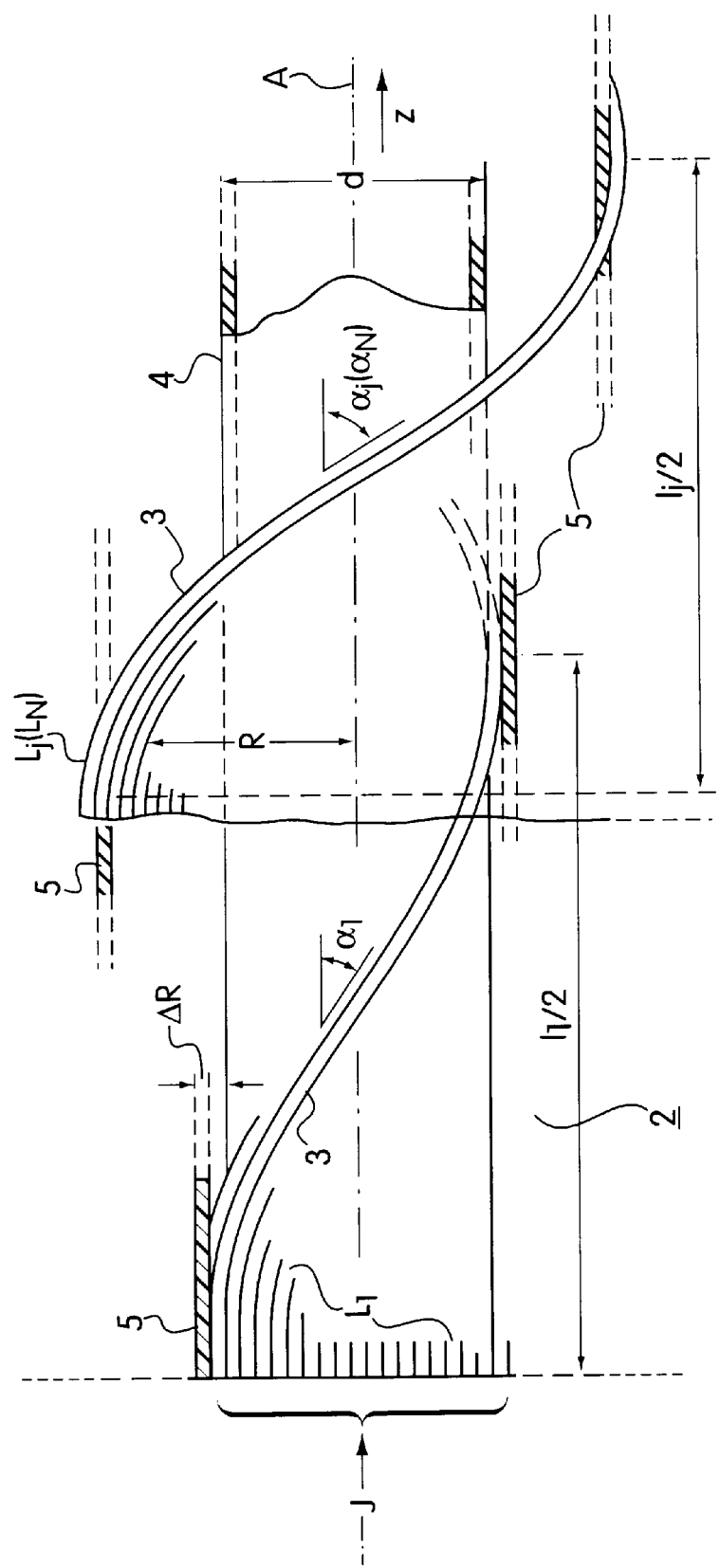
FIG. 1 shows a section of a strand consisting of a single arrangement of conductors according to the present invention.
Figure 2:
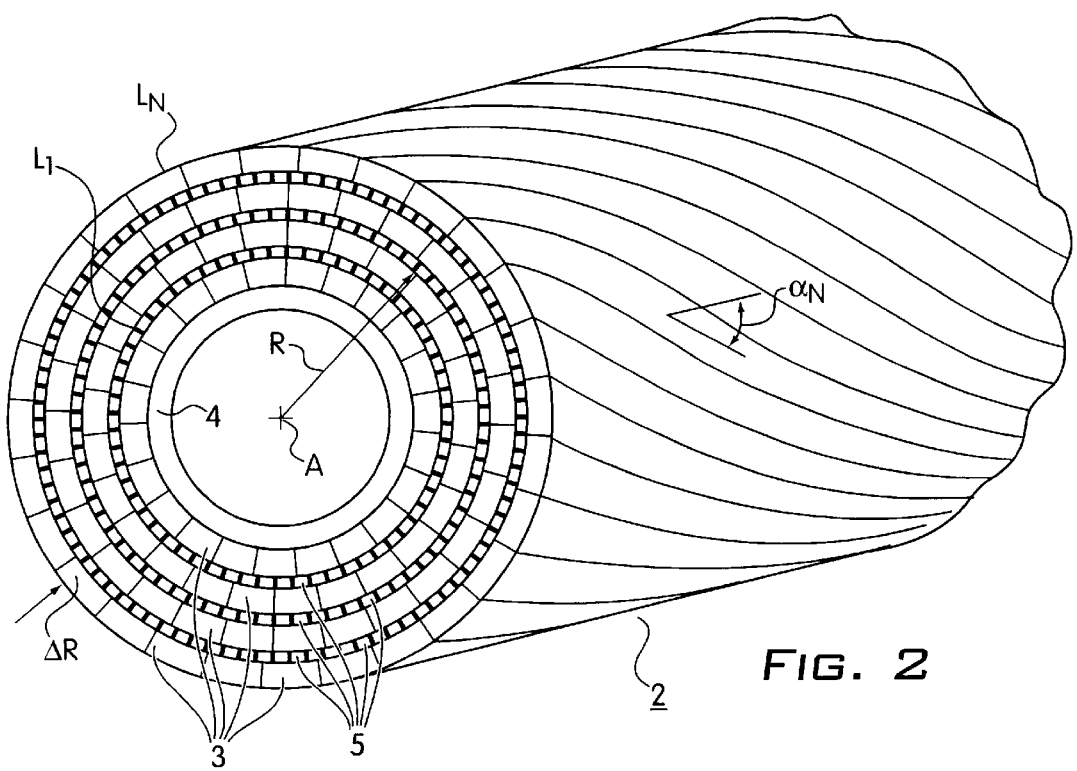
FIG. 2 shows another section of a strand consisting of a single arrangement of conductors.

FIGS. 1 and 2 indicate only one conductor arrangement 2 of a cable core as a part of an a.c. cable according to the present invention. The cable arrangement contains first layer $L_1$ of adjacent individual conductors 3 on a preferably solid or hollow cylindrical carrier body 4 enclosing a longitudinal axis A. Axis A points in the direction z of the coordinate system. A superconducting material with high critical temperature $T_c$ (in particular, over 77 K) is selected as the conducting material. The wire- or strip-shaped individual conductors 3 contain therefore an HTSC material such as $(Bi,Pb)_2Sr_2Ca_2Cu_3O_x$, which can be embedded in a normally conducting matrix, for example of Ag or an Ag alloy. The HTSC material can also be applied in the form of a layer onto a normally conducting carrier. The superconducting individual conductors can be configured as single-core conductors or multicore (multifilament) conductors having a round or preferably flat cross section. For example, an HTSC multifilament flat wire with at least 19 filaments having an approximately elliptical cross section can be provided in a silver matrix. An Ag-containing matrix material can also be alloyed with 0.1% to 4% bismuth, lead, antimony, aluminum or zinc, and exhibit a specific electric resistance of at least $10^{-6}$ Ωcm at 77 K. Such a multicore conductor may have twisted conductor cores (filaments) with a twist length of between 1 and 10 cm. For strip-shaped superconductors the width to thickness ratio is preferably between 10:1 and 50:1.

In the radially innermost conductor layer $L_1$ made of a plurality of suitable superconducting single-core or multicore conductors 3 running next to one another, these conductors should always be arranged with a predefined lay length $l_1$, in a helix-shaped arrangement. Depending on the diameter d of carrier body 4, a predefined wire angle $\alpha_1$ is then obtained between the longitudinal direction of each superconductor 3 and the longitudinal direction (axial direction z) of carrier body 4.

At least one additional layer $L_j$ of superconducting individual conductors 3, which is only shown in FIGS. 1 and 2, is arranged around layer $L_1$; the individual conductors are advantageously similar to those of layer $L_1$. (Therefore the following applies to index j: $1 \leq j \leq N$ with $N \geq 2$.) A thin electric insulation 5 can be provided between adjacent conductor layers. A thin electrically conducting layer, however, can also be provided between said layers. The layer can be made of poorly conducting material, for example, carbon paper, with a surface resistance between $10^{-2}$ and $10^{-6}$ Ωcm². According to the present invention, a predefined lay length $l_j$ and thus a wire angle $\alpha_j$, dependent on said length, is to be provided for the individual conductors 3 of the additional layer $L_j$. The specific values for the lay lengths $l_1$ and $l_j$, as well as the wire angles $\alpha_1$ and $\alpha_j$, are selected according to the present invention so that the current transported by the entire a.c. cable is distributed at least approximately evenly to all conductor layers $L_j$, taking into account the mutual influence of the conductor arrangements serving as forward and return conductors. This means that in the conductor arrangement 2 shown with N ($\geq 2$) layers $L_j$ of individual conductors 3, each of these layers must have at least approximately the same specific current density $J_j = J$. Specific current density $J_j$ of the jth conductor layer $L_j$ is understood in this case to be the total current referred to the circumference of the respective conductor layer $L_j$ and the cosine of the wire angle $\alpha_j$ of the conductor in this layer. This means, $$J_j = I_{ges}/(2\pi r_j * N * \cos \alpha_j)$$

with $I_{ges}$=total current in the entire cable core, $r_j$=mean radius of the conductor layer $L_j$.

To determine the specific values for $\alpha_j$, let us consider first a cable (cable core) with the only one conductor arrangement 2 indicated in FIGS. 1 and 2, where current flows in one direction only (e.g. in the forward direction). The lay lengths $l_j$ and the wire angles $\alpha_j$ of the individual conductor layers $L_j$ must at least approximately satisfy the following mathematical relation:

$$\frac{2\pi R}{l_{j+1}} - \frac{2\pi R}{l_j} = \tan\alpha_{j+1} - \tan\alpha_j = \frac{2\Delta R \sum_{k=1}^{j} \cos\alpha_k}{R \cdot (H_z/J)},$$

with $$H_z/J = \sum_{k=1}^{N} \sin\alpha_k,$$

where

R is the mean radius of the totality of all conductor layers $L_j$;

$H_z/J$ is the axial field $H_z$ inside conductor arrangement 2 divided by the specific current density $J=J_j$;

$\Delta R$ is the radial distance between the individual conductor layers. This distance corresponds to the thickness of the individual conductors 3 plus the thickness of layer insulation 5 that may be present;

j is the index of the corresponding conductor layer $L_j$ (with $1 \leq j \leq N$);

N is the total number of all conductor layers in the conductor arrangement.

Since $H_z/J$ in the denominator of the above recursive formula already contains all the desired $\alpha_j$, the above equation can be solved iteratively. Thus, each predefined value $H_z/J$ (in the axial direction z) will contain a set of angles $\{\alpha_j\}$. The wire angles $\alpha_j$ either only increase or only decrease radially from the inside out from one layer to another. This is not the case with the known cable designs (see e.g., German Published Patent Application No. 1 814 036 or European Patent No. 623 937 A).

The embodiment of a cable illustrated in FIGS. 1 and 2 is based on the fact that its only conductor arrangement 2 should conduct alternating current in only one direction of its axis A, so that it represents a forward conductor only, for example. Therefore, for the a.c. cable according to the present invention, only one additional a.c. conductor arrangement is required as a return conductor. In a.c. cables, in particular for three-phase power transmission, generally cable cores that are electrically and magnetically neutral to the outside are desirable. Therefore the current of each phase is conducted back through a concentric outside conductor (or vice-versa). No field is present outside each cable core in this case. In a superconducting cable with forward and return conductors, such a design is indispensable; otherwise stray fields of the phase conductors running in parallel would induce additional compensating currents between the individual conductors of the stranded cable. In that case, the unavoidable a.c. field components perpendicular to the superconducting individual conductors would cause unacceptably high losses. Furthermore, additional eddy current losses would occur in a cryogenic shell made of metallic material.

Figure 3:
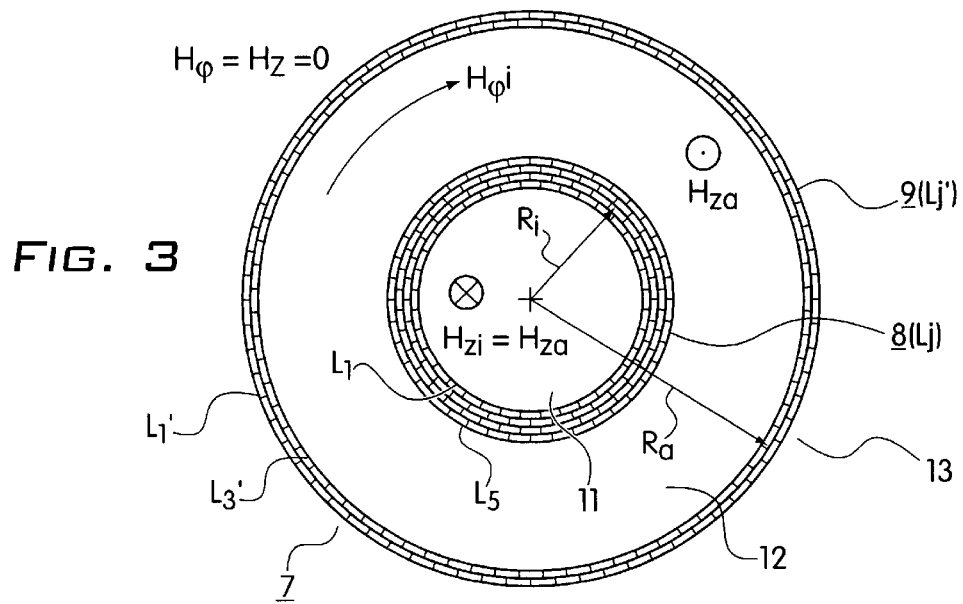
FIG. 3 shows a cross section of a cable according to the present invention with concentric forward and return conductors.

FIG. 3 schematically shows the cross section of such a cable core 7 of an a.c. cable according to the present invention. It contains an internal conductor arrangement 8, serving as a forward conductor, for example, with a mean radius $R_i$ of the winding of its conductor layers $L_j$ and an outside conductor arrangement 9 concentric to said internal conductor arrangement, with a mean radius $R_a$ of the winding of its conductor layers $L_j'$. The specific current density in the conductor layers of the external conductor arrangement should be opposite to that in the conductor layers of the internal conductor arrangement, i.e., should be equal to −J. Five conductor layers $L_j$ of the internal conductor arrangement 8 and three conductor layers $L_j'$ of the external conductor arrangement 9 are indicated in FIG. 3. Conductor layers $L_j$ of the internal conductor arrangements are counted radially from the inside outward, while the conductor layers $L_j'$ of the external conductor arrangement are counted in the opposite direction. The overlapping axial fields $H_{zi}+H_{za}$ from the internal and external conductor arrangements are effective in the internal space 11 of the internal conductor arrangement, while only the axial field $H_{za}$ is effective in the intermediary space 12 between the internal and external conductor arrangements, where an azimuthal field $H_{\phi i}$ is also effective. The external space 13 is field-free ($H_{\phi i}=H_z=0$).

By analogy to the above mathematical notation for $\tan \alpha_{j+1} - \tan \alpha_j$ for a cable core of an a.c. cable forming only one forward conductor, for an a.c. cable according to this invention, with a cable core 7, having an internal conductor arrangement 8 and an external conductor arrangement 9 concentrically to one another, the following equations apply at least approximately:

a) for the internal conductor arrangement 8:

$$\frac{2\pi R_i}{l_{j+1,i}} - \frac{2\pi R_i}{l_{ji}} = \tan\alpha_{j+1,i} - \tan\alpha_{ji}$$

$$= \frac{2\Delta R_i \sum_{k=1}^{j} \cos\alpha_{ki}}{R_i \cdot (H_{zi}/J)}$$

with $$H_{zi}/J = \sum_{k=1}^{N_i} \sin\alpha_{ki} - \frac{N_i R_i}{N_a R_a} \sum_{k=1}^{N_a} \sin\alpha_{ka}$$

and b) for the external conductor arrangement 9:

$$\frac{2\pi R_a}{l_{j+1,a}} - \frac{2\pi R_a}{l_{ja}} = \tan\alpha_{j+1,a} - \tan\alpha_{ja}$$

$$= \frac{2\Delta R_a \sum_{k=1}^{j} \cos\alpha_{ka}}{R_a (H_{za}/J)}$$

with $$H_{za}/J = \frac{N_a R_a R_i^2}{N_i R_i R_a^2} \sum_{k=1}^{N_i} \sin\alpha_{ki} - \sum_{k=1}^{N_a} \sin\alpha_{ka}$$

Indices i and a refer here to the internal and external conductor arrangements, respectively. Summation is done over the number of layers $N_i$ of the internal conductor arrangement and over the number of layers $N_a$ of the external conductor arrangement. In the external space 13, all fields are equal to zero. The azimuthal field $H_{\Omega a}$ between the individual layers $L_j'$ of the external conductor arrangement 9 increases radially from the outside inward, contrary to the internal conductor arrangement. This fact is taken into consideration by the order of numbers from the outside inward in FIG. 3.

The above mathematical equations apply to all a.c. cables with concentric external and internal conductor arrangements; only one of the number of layers $N_i$ or $N_a$ must be greater than 1. Thus, these equations are applicable, for example, to an a.c. cable having an internal conductor arrangement with two conductor layers and an external conductor arrangement with a single conductor layer. Thus the following must apply: $N_i+N_a \geq 3$. For example, if the external conductor arrangement only has a single conductor layer, the respective dimensioning formula for the wire angle $\alpha_{1a}$ no longer applies. The value to be specifically selected for $\alpha_{1a}$ must, however, be included in the formula for calculating the internal conductor arrangement via the equation for $H_{zi}/J$.

Table 1 gives a few sets of wire angles $\alpha_j$ for internal and external conductor arrangements with 6/4 and 3/2 conductor layers, respectively, which are to be observed for specific pairs of values ($H_{zi}/J$ with $H_{za}/J$). They are based on special values $2\Delta R_i/R_i$ and $2\Delta R_a/R_a$. In addition to these few examples, additional stranding schemes can be obtained by varying the parameters $H_{zi}/J$ and $H_{za}/J$ to satisfy the specific requirements of a stranding procedure, the mechanical stability of the stranded cable, adjustment to heat expansion when cooling, etc. as much as possible. All these variations are considered equivalent from the point of view of a.c. field losses.

TABLE 1

| $H_{zi}/J$ | $H_{za}/J$ | $\alpha_1$ | $\alpha_2$ | $\alpha_3$ | $\alpha_4$ | $\alpha_5$ | $\alpha_6$ | $\alpha_1$ | $\alpha_2$ | $\alpha_3$ | $\alpha_4$ |
|---|---|---|---|---|---|---|---|---|---|---|---|
| 6/4 Layers | | Internal Conductor $2\Delta R_i/R_i = 0.033$ | | | | | | External Conductor $2\Delta R_a/R_a = 0.02$ | | | |
| 0.1 | −0.1 | −37 | −32 | −18.5 | 7 | 36 | 57 | −20 | −13 | 2.5 | 25 |
| 0.2 | −0.1 | −28 | −23 | −13 | 5 | 28 | 47 | −16 | −10.5 | 2 | 20 |
| 0.6 | −0.1 | −9 | −7 | −1.3 | 7 | 17 | 29 | −10 | −6.5 | 0.2 | 10 |
| 0.6 | 0.1 | −14 | −10.5 | −3 | 8 | 21.5 | 35 | −17 | −10 | 6 | 28 |

TABLE 1-continued

| $H_{zi}/J$ | $H_{za}/J$ | $\alpha_1$ | $\alpha_2$ | $\alpha_3$ | $\alpha_4$ | $\alpha_5$ | $\alpha_6$ | $\alpha_1$ | $\alpha_2$ | $\alpha_3$ | $\alpha_4$ |
|---|---|---|---|---|---|---|---|---|---|---|---|
| 3/2 Layers | | | | $2\Delta R_i/R_i = 0.04$ | | | | | $2\Delta R_a/R_a = 0.0217$ | | |
| 0.2 | 0 | −10.5 | 0.5 | 22 | | | | −8.5 | 8.5 | | |
| 0.1 | 0 | −24 | −4 | 35 | | | | −16 | 16 | | |
| 0 | 0.2 | 17 | 4.5 | −22 | | | | 9 | 2.7 | | |
| 0.05 | −0.05 | −26 | −6 | 36 | | | | −10 | 7.5 | | |

Figure 4:
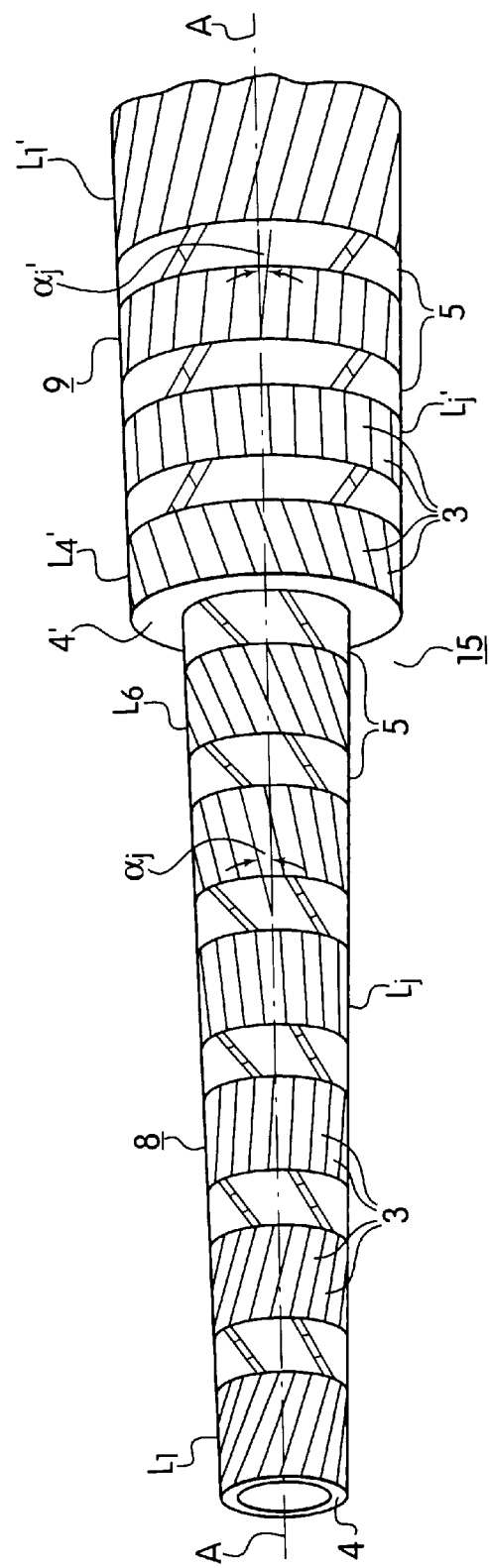
FIG. 4 shows an oblique section of the cable of FIG. 3.

FIG. 4 shows a suitably stranded cable core 15 of an a.c. cable according to the present invention with an internal conductor arrangement 8 and external conductor arrangement 9. The internal conductor arrangement has six conductor layers $L_j$ (j=1, ... 6) concentrically enclosing a carrier body 4 and spaced from one another by layer insulations 5. An additional carrier body 4' enclosing the spire of conductor layers $L_i$ carries four concentric suitably spaced conductor layers $L_j'$ (with j=1, ... 4) of external conductor arrangement 9. As FIG. 4 shows, all conductor layers of the internal and external conductor arrangements have different wire angles $\alpha_j$ and $\alpha_j'$ with a stepwise transition between negative angles to positive angles, taking into account the different ways of counting the internal and external conductors. This rule, however, does not always need to be followed. A stepwise change in the angle can also occur in the opposite direction (see Table 1, embodiment with 3/2 conductor layers). However, in an a.c. cable according to the present invention that has at least one conductor arrangement with at least three conductor layers, the wire angles either always increase stepwise or always decrease stepwise (without polarity reversal of the angle change). This feature is not present in the known cable designs, for example, the cables described in German Patent No. 1 814 036 or European Patent No. 623 937 A.

The above-described embodiments are based on the fact that the individual electric conductors of the a.c. cable according to the present invention should be conductors with at least one conductor core made of an HTSC material. The measures to be applied regarding the choice of special wire angles are considered particularly advantageous for individual conductors made of such material; the considerations concerning these angles also apply, however, to individual conductors with conventional superconducting materials, such as NbTi or $Nb_3Sn$, which require refrigeration with liquid He.

The measures according to the present invention can also be used with a.c. cables with normally conducting individual conductors, e.g., conductors made of Cu or Cu alloys, in which case the skin effects occurring with these materials can be taken into account with said measures.

What is claimed is:

1. An alternating current cable, comprising:

at least one cable core including inner and outer concentric conductor arrangements of stranded individual conductors, wherein the inner concentric conductor arrangement is a forward conductor and the outer concentric conductor arrangement is a return conductor, wherein at least one of the inner and outer conductor arrangements includes a plurality of conductor layers of the individual conductors arranged in a helix-like manner with predetermined stranding angles around a carrier body, wherein the predetermined stranding angles are selected so that the following relationships are satisfied for the inner concentric conductor arrangement:

$$\frac{2\pi R_i}{l_{j+1,i}} - \frac{2\pi R_i}{l_{ji}} = \tan\alpha_{j+1,i} - \tan\alpha_{ji}$$

$$= \frac{2\Delta R_i \sum_{k=1}^{j} \cos\alpha_{ki}}{R_i \cdot (H_{zi}/J)}$$

with $$H_{zi}/J = \sum_{k=1}^{N_i} \sin\alpha_{ki} - \frac{N_i R_i}{N_a R_a} \sum_{k=1}^{N_a} \sin\alpha_{ka}$$

and wherein the predetermined stranding angles are selected so that the following relationships are satisfied for the outer concentric conductor arrangement:

$$\frac{2\pi R_a}{l_{j+1,a}} - \frac{2\pi R_a}{l_{ja}} = \tan\alpha_{j+1,a} - \tan\alpha_{ja}$$

$$= \frac{2\Delta R_a \sum_{k=1}^{j} \cos\alpha_{ka}}{R_a (H_{za}/J)}$$

with $$H_{za}/J = \frac{N_a R_a R_i^2}{N_i R_i R_a^2} \sum_{k=1}^{N_i} \sin\alpha_{ki} - \sum_{k=1}^{N_a} \sin\alpha_{ka}$$

wherein $l_{ji}$ and $l_{ja}$ are lengths of a pitch of the individual conductors in a jth conductor layer of the inner conductor arrangement and the outer conductor arrangement, respectively;

$\alpha_{ji}$ and $\alpha_{ja}$ are the predetermined stranding angles of the individual conductors in the jth conductor layer of the inner conductor arrangement and the outer conductor arrangement, respectively;

$N_i$ and $N_a$ are the numbers of conductor layers of the inner conductor arrangement and the outer conductor arrangement, respectively;

$H_{zi}$ and $H_{za}$ are axial fields induced in an interior of the cable core by the inner conductor arrangement and the outer conductor arrangement, respectively;

J is the specific current density in each conductor layer;

$R_i$ and $R_a$ are the mean radii of a combination of all conductor layers of the inner conductor arrangement and the outer conductor arrangement, respectively; and $\Delta R_i$ and $\Delta R_a$ are differences between the mean radii of adjacent conductor layers of the inner conductor arrangement and the outer conductor arrangement, respectively.

2. The cable according to claim 1, wherein each of the individual conductors includes a superconducting material.

3. The cable according to claim 2, wherein the superconducting material includes a high-$T_c$ superconducting material.

4. The cable according to claim 3, wherein each of the individual conductors further includes at least one conductor core, the at least one conductor core including the high-$T_c$ superconducting material in one of a silver and a silver alloy matrix.

5. The cable according to claim 1, wherein each of the individual conductors includes a normally conducting material.

6. The cable according to claim 1, wherein each of the individual conductors has one of a strip shape and a wire shape.

7. The cable according to claim 6, wherein a ratio of a width to a thickness of each of the individual conductors having the strip shape is between 10:1 and 50:1.

8. The cable according to claim 1, further comprising:

a further layer composed of one of an insulating material and an electrically conducting material, wherein the further layer is arranged between adjacent conductor layers of the plurality of conductor layers.

* * * * *